US012579995B2

(12) United States Patent
Li et al.

(10) Patent No.: US 12,579,995 B2
(45) Date of Patent: Mar. 17, 2026

(54) AUTOMATIC SPEECH RECOGNITION ACCURACY WITH MULTIMODAL EMBEDDINGS SEARCH

(71) Applicant: Google LLC, Mountain View, CA (US)

(72) Inventors: Christopher Li, New York, NY (US); Kyle Scott Kastner, Waltham, MA (US); Yuan Wang, Hoboken, NJ (US); Zhehuai Chen, Edgewater, NJ (US); Andrew Maxwell Rosenberg, Brooklyn, NY (US); Heng Su, Beijing (CN); Qian Chen, Beijing (CN); Leonid Aleksandrovich Velikovich, New York, NY (US); Patrick Maxim Rondon, New York, NY (US); Diamantino Antonio Caseiro, Philadelphia, PA (US); Zelin Wu, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 277 days.

(21) Appl. No.: 18/344,007

(22) Filed: Jun. 29, 2023

(65) Prior Publication Data

US 2025/0006217 A1     Jan. 2, 2025

(51) Int. Cl.
G10L 25/30 (2013.01)
G10L 15/26 (2006.01)

(52) U.S. Cl.
CPC .............. G10L 25/30 (2013.01); G10L 15/26 (2013.01)

(58) Field of Classification Search
CPC ....... G10L 25/30; G10L 15/26; G10L 15/063; G10L 15/16; G06N 3/045
See application file for complete search history.

(56) References Cited

U.S. PATENT DOCUMENTS

2011/0153325 A1* 6/2011 Ballinger ............ G06F 3/04886
704/235
2017/0270929 A1* 9/2017 Aleksic ................... G10L 15/22
(Continued)

FOREIGN PATENT DOCUMENTS

CN         114912441 A     8/2022

OTHER PUBLICATIONS

International Search Report and Written Opinion (EPO) for Application No. PCT/US2024/034505) dated Aug. 16, 2024.
(Continued)

*Primary Examiner* — Michael N Opsasnick
(74) *Attorney, Agent, or Firm* — Honigman LLP; Brett A. Krueger; Grant Griffith

(57) ABSTRACT

A method includes receiving training data that includes a set of transcribed speech utterances where each respective transcribed speech utterance is paired with a corresponding transcription. For each respective transcribed speech utterance, the method includes generating an encoded audio representation and an encoded textual representation, generating a higher order audio feature representation for a corresponding encoded audio representation, generating a higher order textual feature representation for a corresponding encoded textual representation, and determining a loss for the respective transcribed speech utterance based on the higher order audio feature representation and the higher order textual feature representation. The method also includes training a speech encoder and a text encoder of a correction model based on the loss determined for each transcribed speech utterance of the set of transcribed speech utterances.

20 Claims, 10 Drawing Sheets

(56) References Cited

U.S. PATENT DOCUMENTS

| | | | |
|---|---|---|---|
| 2018/0137109 A1* | 5/2018 | Mangoubi | G06F 40/263 |
| 2018/0350353 A1* | 12/2018 | Gruber | G10L 15/26 |
| 2019/0295531 A1* | 9/2019 | Rao | G10L 15/26 |
| 2021/0304769 A1* | 9/2021 | Ye | G10L 15/26 |
| 2022/0068255 A1 | 3/2022 | Chen et al. | |
| 2022/0374605 A1* | 11/2022 | Sethi | G06T 19/006 |
| 2023/0214579 A1* | 7/2023 | Somech | G06N 3/0455 |
| | | | 715/271 |
| 2023/0419952 A1* | 12/2023 | Desai | G06F 40/35 |
| 2025/0006217 A1* | 1/2025 | Li | G10L 15/16 |

OTHER PUBLICATIONS

Zhehuai Chen et al: Maestro: Matched Speech Text Representations through Modality Matching', Arxiv.org, Cornell University Library, 201 Olin Library Cornell University Ithaca, NY 14853, Jul. 1, 2022 (Jul. 1, 2022), XP091261450.

* cited by examiner

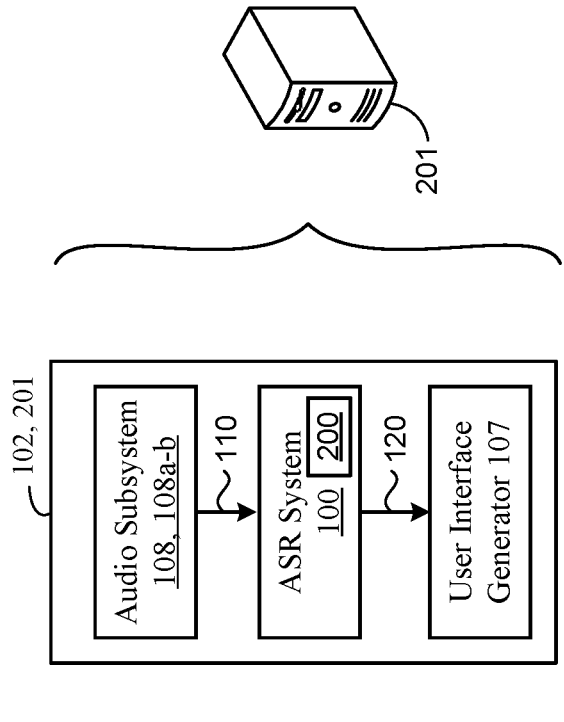
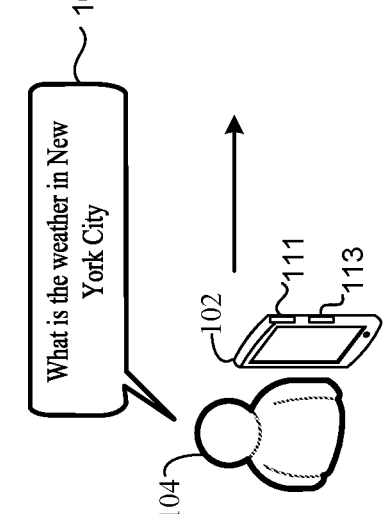
FIG. 1

200
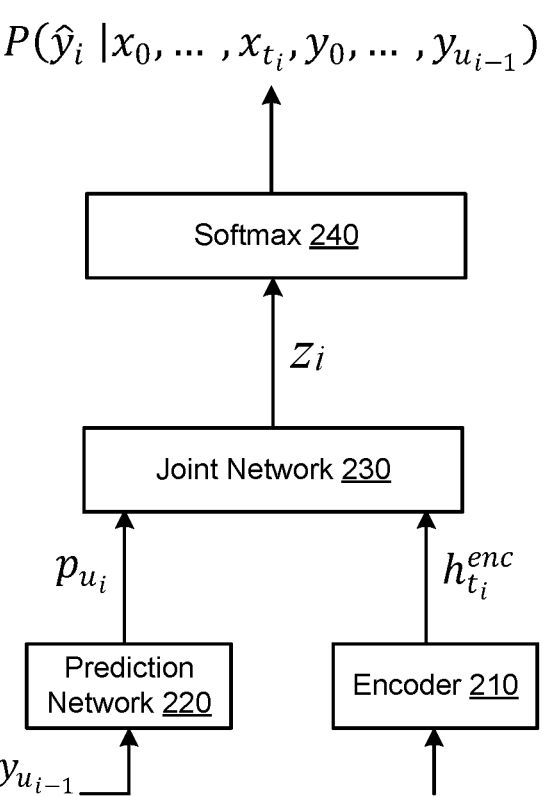
FIG. 2

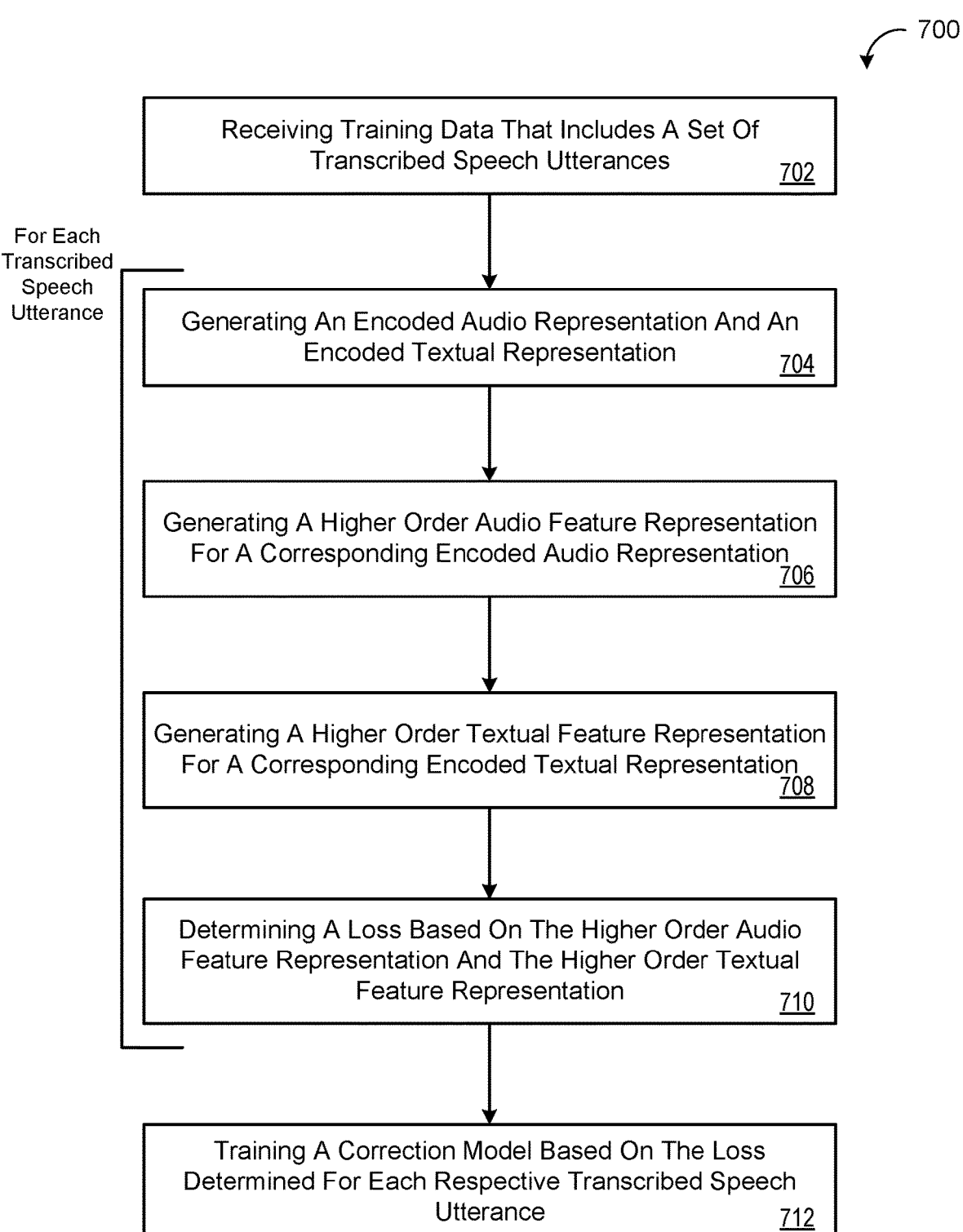

700

For Each
Transcribed
Speech
Utterance

Receiving Training Data That Includes A Set Of
Transcribed Speech Utterances     702

Generating An Encoded Audio Representation And An
Encoded Textual Representation     704

Generating A Higher Order Audio Feature Representation
For A Corresponding Encoded Audio Representation     706

Generating A Higher Order Textual Feature Representation
For A Corresponding Encoded Textual Representation     708

Determining A Loss Based On The Higher Order Audio
Feature Representation And The Higher Order Textual
Feature Representation     710

Training A Correction Model Based On The Loss
Determined For Each Respective Transcribed Speech
Utterance     712

FIG. 7

AUTOMATIC SPEECH RECOGNITION ACCURACY WITH MULTIMODAL EMBEDDINGS SEARCH

TECHNICAL FIELD

This disclosure relates to improving automatic speech recognition accuracy with multimodal embeddings search.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g., a low word error rate (WER)) and latency (e.g., delay between a user speaking the transcription) based on ongoing development of deep neural networks. However, one challenge in developing deep learning-based ASR models is that parameters of the ASR models tend to over fit the training data, thereby resulting in the ASR models having difficulties generalizing unseen data when the training data is not extensive enough. Thus, some ASR models leverage additional transcriptions to correct any terms that the ASR model initially misrecognized.

SUMMARY

One aspect of the disclosure provides a computer-implemented method that when executed on data processing hardware causes the data processing hardware to perform operations for improving automatic speech recognition accuracy with multimodal embeddings search. The operations include receiving training data that includes a set of transcribed speech utterances where each respective transcribed speech utterance is paired with a corresponding transcription. For each respective transcribed speech utterance of the set of transcribed speech utterances, the operations also include: generating, by a shared audio-text encoder of a speech recognition model, an encoded audio representation for the respective transcribed speech utterance and an encoded textual representation for a corresponding transcription of the respective transcribed speech utterance; generating, by a speech encoder of a correction model, a higher order audio feature representation for a corresponding encoded audio representation; generating, by a text encoder of the correction model, a higher order textual feature representation for a corresponding encoded textual representation; and determining a loss for the respective transcribed speech utterance based on the higher order audio feature representation and the higher order textual feature representation each corresponding to the respective transcribed speech utterance. The operations also include training the speech encoder and the text encoder of the correction recognition model based on the loss determined for each respective transcribed speech utterance of the set of transcribed speech utterances.

Implementations of the disclosure may include one or more of the following optional features. In some implementations, the operations further include receiving a speech utterance spoken by a user associated with a user device, generating an initial transcription for the speech utterance using the speech recognition model, and generating a second higher order audio feature representation for the speech utterance using the trained speech encoder of the correction model. In these implementations, the operations may further include: generating a list of biasing phrases based on context data of the user device; for each respective biasing phrase in the list of biasing phrases, generating a second higher order textual feature representation for the respective biasing phrase using the trained text encoder of the correction model, and determining a corresponding cosine distance between the second higher order audio feature representation and the second higher order textual feature representation; and determining a nearest neighbor second higher order textual feature representation from the second higher order textual feature representations generated by the trained text encoder for each respective biasing phrase by selecting a respective one of the second higher order textual feature representations that includes a lowest corresponding cosine distance. Here, the operations may further include determining that the initial transcription is an inaccurate transcription for the speech utterance and replacing the initial transcription generated by the speech recognition model with an updated transcription corresponding to the nearest neighbor higher order textual feature representation in response to determining that the initial transcription is an inaccurate transcription for the speech utterance.

In some examples, the speech encoder includes a first stack of multi-head self-attention layers and the text encoder includes a second stack of multi-head self-attention layers. In these examples, the first and second stack of multi-head self-attention layers may include a stack of transformer layers or a stack of conformer layers. In some implementations, the operations further include obtaining context data from a user device that receives a speech utterance where the context data indicates a current context of the user device and generating a list of biasing phrases based on the context data. Each biasing phrase in the list of biasing phrases is associated with the current context of the user device. In these implementations the context data obtained from the user device includes at least one of a dialog state of the user device, a device state of the user device, a geographic location of the user device, an application executing on the user device, or a language of a speech utterance received by the user device.

In some examples, the training data further includes a set of unspoken textual utterances. Here, each unspoken textual utterance is not paired with any corresponding spoken utterance. In these examples, the operations may further include generating a corresponding synthetic speech utterance for each unspoken textual utterance of the set of unspoken textual utterances using a text-to-speech model.

Another aspect of the disclosure provides a system that includes data processing hardware and memory hardware storing instructions that when executed on the data processing hardware causes the data processing hardware to perform operations. The operations include receiving training data that includes a set of transcribed speech utterances where each respective transcribed speech utterance is paired with a corresponding transcription. For each respective transcribed speech utterance of the set of transcribed speech utterances, the operations also include: generating, by a shared audio-text encoder of a speech recognition model, an encoded audio representation for the respective transcribed speech utterance and an encoded textual representation for a corresponding transcription of the respective transcribed speech utterance; generating, by a speech encoder of a correction model, a higher order audio feature representation for a corresponding encoded audio representation; generating, by a text encoder of the correction model, a higher order textual feature representation for a corresponding encoded textual representation; and determining a loss for the respective transcribed speech utterance based on the higher order audio feature representation and the higher order textual feature representation each corresponding to the respective transcribed speech utterance. The operations also include training the speech encoder and the text encoder of the correction recognition model based on the loss determined for each respective transcribed speech utterance of the set of transcribed speech utterances.

Implementations of the disclosure may include one or more of the following optional features. In some implementations, the operations further include receiving a speech utterance spoken by a user associated with a user device, generating an initial transcription for the speech utterance using the speech recognition model, and generating a second higher order audio feature representation for the speech utterance using the trained speech encoder of the correction model. In these implementations, the operations may further include: generating a list of biasing phrases based on context data of the user device; for each respective biasing phrase in the list of biasing phrases, generating a second higher order textual feature representation for the respective biasing phrase using the trained text encoder of the correction model, and determining a corresponding cosine distance between the second higher order audio feature representation and the second higher order textual feature representation; and determining a nearest neighbor second higher order textual feature representation from the second higher order textual feature representations generated by the trained text encoder for each respective biasing phrase by selecting a respective one of the second higher order textual feature representations that includes a lowest corresponding cosine distance. Here, the operations may further include determining that the initial transcription is an inaccurate transcription for the speech utterance and replacing the initial transcription generated by the speech recognition model with an updated transcription corresponding to the nearest neighbor higher order textual feature representation in response to determining that the initial transcription is an inaccurate transcription for the speech utterance.

In some examples, the speech encoder includes a first stack of multi-head self-attention layers and the text encoder includes a second stack of multi-head self-attention layers. In these examples, the first and second stack of multi-head self-attention layers may include a stack of transformer layers or a stack of conformer layers. In some implementations, the operations further include obtaining context data from a user device that receives a speech utterance where the context data indicates a current context of the user device and generating a list of biasing phrases based on the context data. Each biasing phrase in the list of biasing phrases is associated with the current context of the user device. In these implementations the context data obtained from the user device includes at least one of a dialog state of the user device, a device state of the user device, a geographic location of the user device, an application executing on the user device, or a language of a speech utterance received by the user device.

In some examples, the training data further includes a set of unspoken textual utterances. Here, each unspoken textual utterance is not paired with any corresponding spoken utterance. In these examples, the operations may further include generating a corresponding synthetic speech utterance for each unspoken textual utterance of the set of unspoken textual utterances using a text-to-speech model.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 is a schematic view of an example speech recognition system.

FIG. 2 is a schematic view of an example speech recognition model.

FIG. 7 is a flowchart of an example arrangement of operations for a method of improving automatic speech recognition accuracy with multimodal embeddings search.

Like reference symbols in the various drawings indicate like elements.

DETAILED DESCRIPTION

Figure 3A:
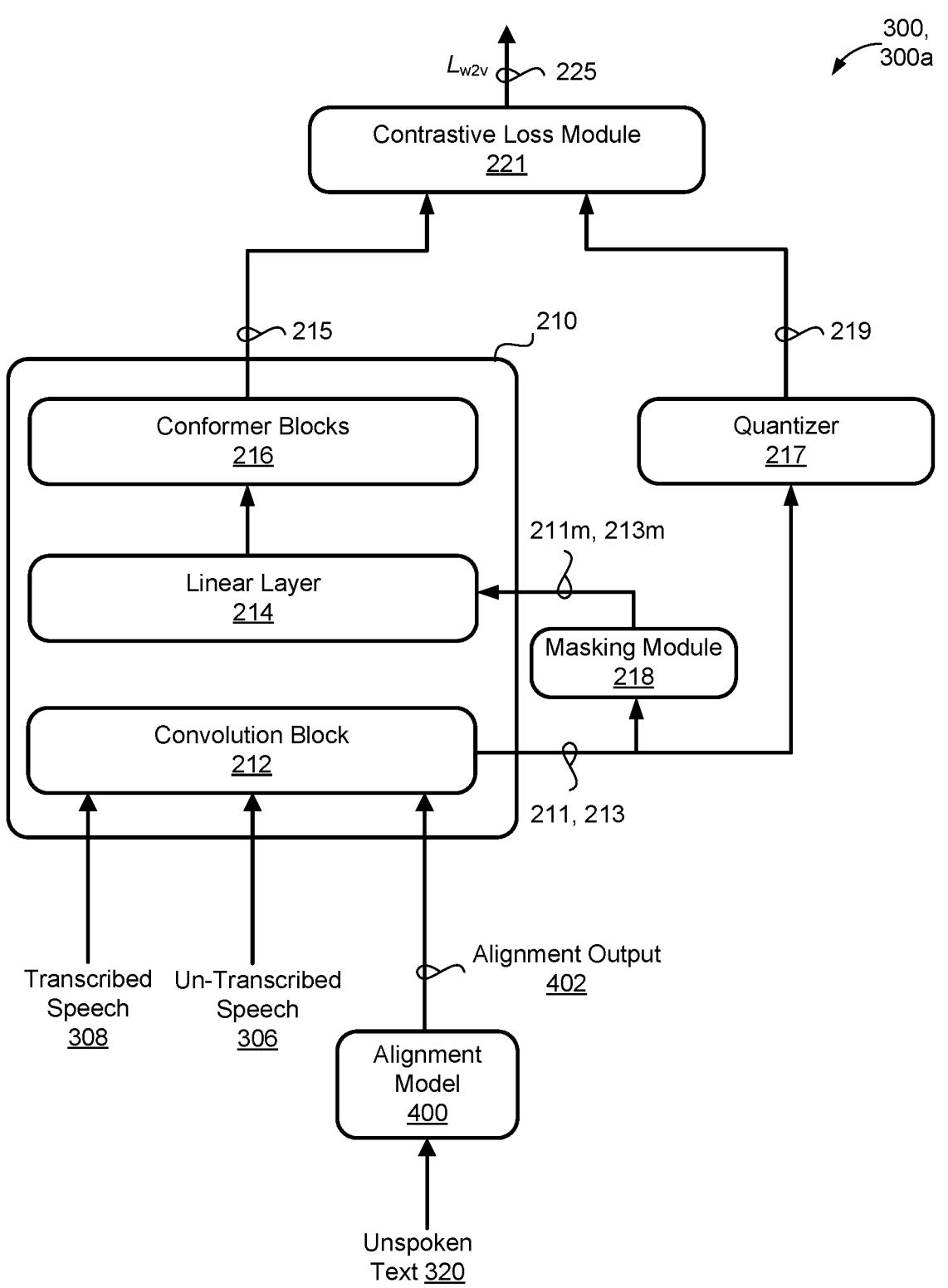
FIGS. 3A-3C are schematic views of an example training process for training a shared audio-text encoder.

Automatic speech recognition (ASR) systems can suffer from low accuracy for various reasons including, but not limited to, noisy input audio data and using an insufficient amount of training data during training. Moreover, many modern ASR systems include end-to-end models that oftentimes lack separate acoustic and language models that are configured to further process input audio to improve recognition results. As such, some ASR systems improve transcription accuracy by obtaining contextually relevant transcriptions, for example, a set of music artists when a device is actively playing music, and biasing the ASR system to generate a transcription that includes one of the contextually relevant transcriptions. Here, biasing the ASR model with the contextually relevant phrases assumes that a user is more likely to speak particular phrases in certain contexts (e.g., speak a music artist when playing music on the device). A common approach is to use a best speech recognition hypothesis as a query to retrieve contextually relevant transcriptions.

However, a major drawback of this approach is when the best speech recognition hypothesis is phonetically dissimilar to the actual utterance spoken by the user thereby causing the ASR system to retrieve implausible contextually relevant transcriptions. Simply put, relying only on the best speech recognition hypothesis as the query (e.g., text query) to obtain contextually relevant transcriptions is a text-only approach that relies on the ASR system generating a best speech recognition hypothesis that is reasonably similar to the utterance actually spoken. Thus, in scenarios where the ASR system generates an implausible best speech recognition hypothesis, retrieving contextually relevant transcriptions is very unlikely to correct the recognition hypothesis because text-only queries have inherently less representational power than audio-based queries.

Accordingly, implementations herein are directed towards methods and systems for improving automatic speech recognition accuracy with multimodal embeddings search. The method includes receiving training data that includes a set of transcribed speech utterances and, for each respective transcribed speech utterance, generating an encoded audio representation and an encoded textual representation by a shared audio-text encoder of a speech recognition model. Notably, the shared audio-text encoder may be trained to generate similar encoded audio and textual representations for related audio and text inputs and generate different encoded audio and textual representations for unrelated audio and text inputs. Stated differently, the distance (e.g., cosine distance) between the encoded audio and textual representations generated by the shared audio-text encoder increases when there is a phonetic dissimilarity between speech and text inputs and decreases when there is phonetic similarity between speech and text inputs. In other examples, the shared audio-text encoder may be trained to generate encoded audio and textual representations for audio-text training input pairs where phonetic similarity is not evident. For instance, the shared audio-text encoder may generate similar audio and text representations for a spoken utterance of "Kesha" and a textual utterance of "Ke$ha."

The method also includes generating a higher order audio feature representation by a speech encoder of a correction model for a corresponding encoded audio representation and generating a higher order textual feature representation by a text encoder of the correction model for a corresponding encoded textual representation. Thereafter, the method includes determining a loss for the respective transcribed speech utterance based on the higher order feature representation and the higher order textual feature representation each corresponding to the respective transcribed speech and training the speech encoder and the text encoder based on the loss.

As will become apparent, training the speech encoder and the text encoder of the correction model in this manner advantageously enables the speech recognition systems to leverage the higher order audio feature representations and the higher order textual feature representations during inference to obtain a list of biasing phrases (e.g., contextually relevant transcriptions) to bias the speech recognition model. Simply put, using text and audio representations to obtain the list of biasing phrases addresses the shortcomings of using text-only data to obtain contextually relevant transcriptions. Moreover, the method may include generating synthetic speech utterances using unspoken textual utterances to expand the training data used to train the speech encoder and the text encoder of the correction model.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware 111 and memory hardware 113.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with an input sequence of acoustic frames 110 capable of being processed by the ASR system 100. In the example shown, the user 104 speaks a respective utterance 106 in a natural language of English for the phrase "What is the weather in New York City?" and the audio subsystem 108 converts the utterance 106 into a corresponding sequence of acoustic frames 110 for input to the ASR system 100. Thereafter, the ASR model 200 receives, as input, the sequence of acoustic frames 110 corresponding to the utterance 106, and generates/predicts, as output, a corresponding transcription 120 (e.g., recognition result/hypothesis) of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription 120 into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106. As will become apparent, the ASR system 100 includes a correction model 510 configured to correct misrecognized transcriptions 120 generated by the ASR model 200 using contextually relevant biasing phrases.

The ASR model 200 may operate in a streaming fashion, a non-streaming fashion, or some combination thereof. The ASR model 200 operates in the streaming fashion by, while receiving the sequence of acoustic frames 110, encoding the sequence of acoustic frames 110 and then decoding the encoded sequence of acoustic frames 110 into an initial transcription (e.g., speech recognition result/hypothesis) 120. Thus, the initial transcription 120 may correspond to words, word pieces, and/or individual characters generated by the ASR model 200 as soon as they are spoken. On the other hand, the ASR model 200 operates in the non-streaming fashion by receiving and processing additional right-context to improve upon the initial transcription 120 thereby generating a final transcription 120. That is, the ASR model 200 processes additional input audio data or encoded acoustic frames (e.g., right-context) to improve the transcription 120 output by the ASR model 200, but at increased latency.

Referring to FIG. 2, an example ASR model 200 may include a Recurrent Neural Network-Transducer (RNN-T) model architecture which adheres to latency constraints with interactive applications. The use of the RNN-T model architecture is exemplary only, as the ASR model 200 may include other architectures such as transformer-transducer and conformer-transducer model architectures among others. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a stack of self-attention layers (e.g., Conformer or Transformer layers) or a recurrent network of stacked Long Short-Term Memory (LSTM) layers. For instance, the encoder network (e.g., encoder) 210 reads a sequence of d-dimensional feature vectors (e.g., acoustic frames 110 (FIG. 1)) $x=(x_1, x_2, \ldots, x_T)$, where $x, \in \mathbb{R}_d$, and produces at each output step a higher-order feature representation (e.g., encoded representation). This higher-order feature representation is denoted as $$h_1^{enc}, \ldots, h_T^{enc}.$$

Figure 3B:
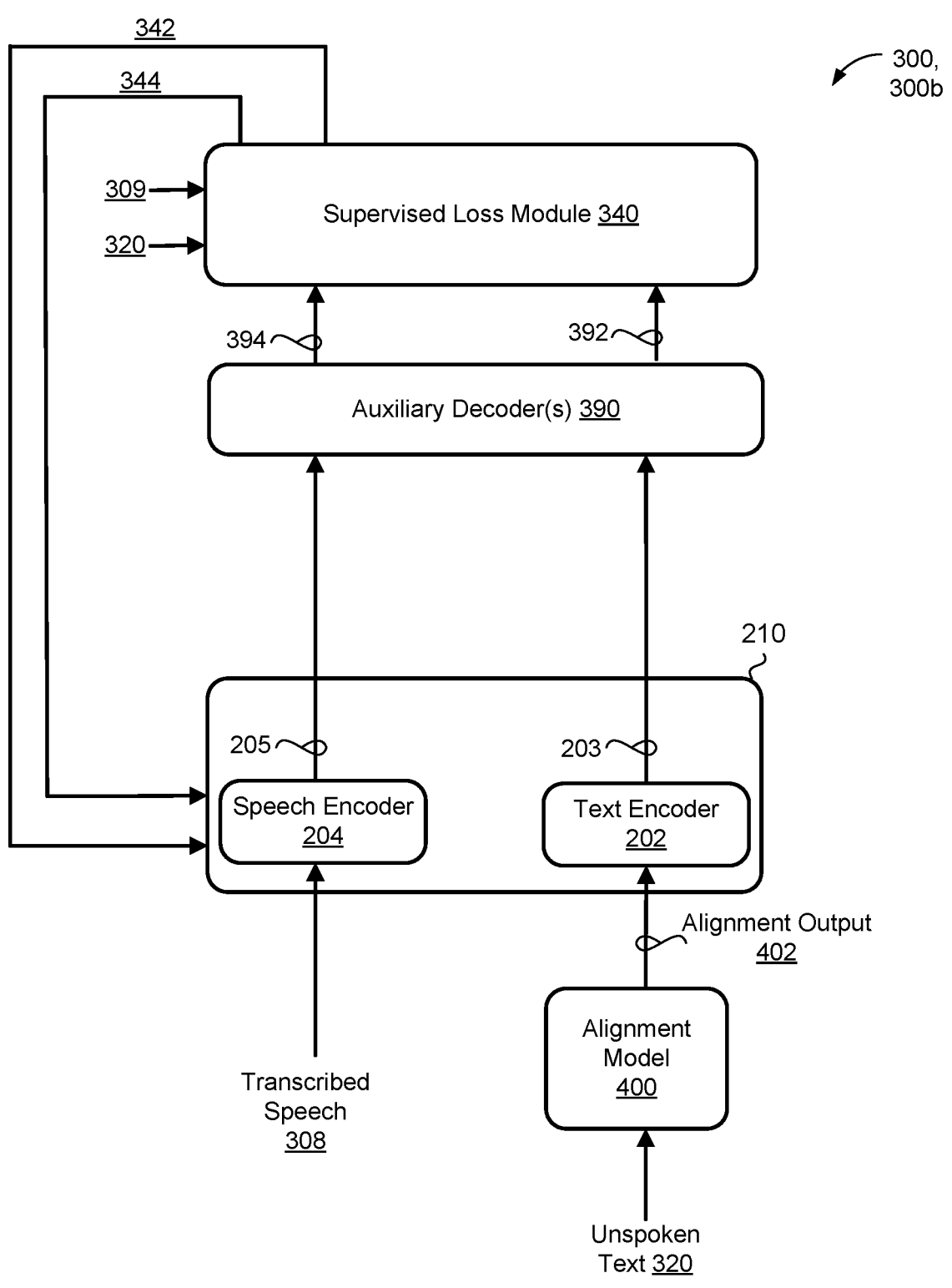
Figure 3C:
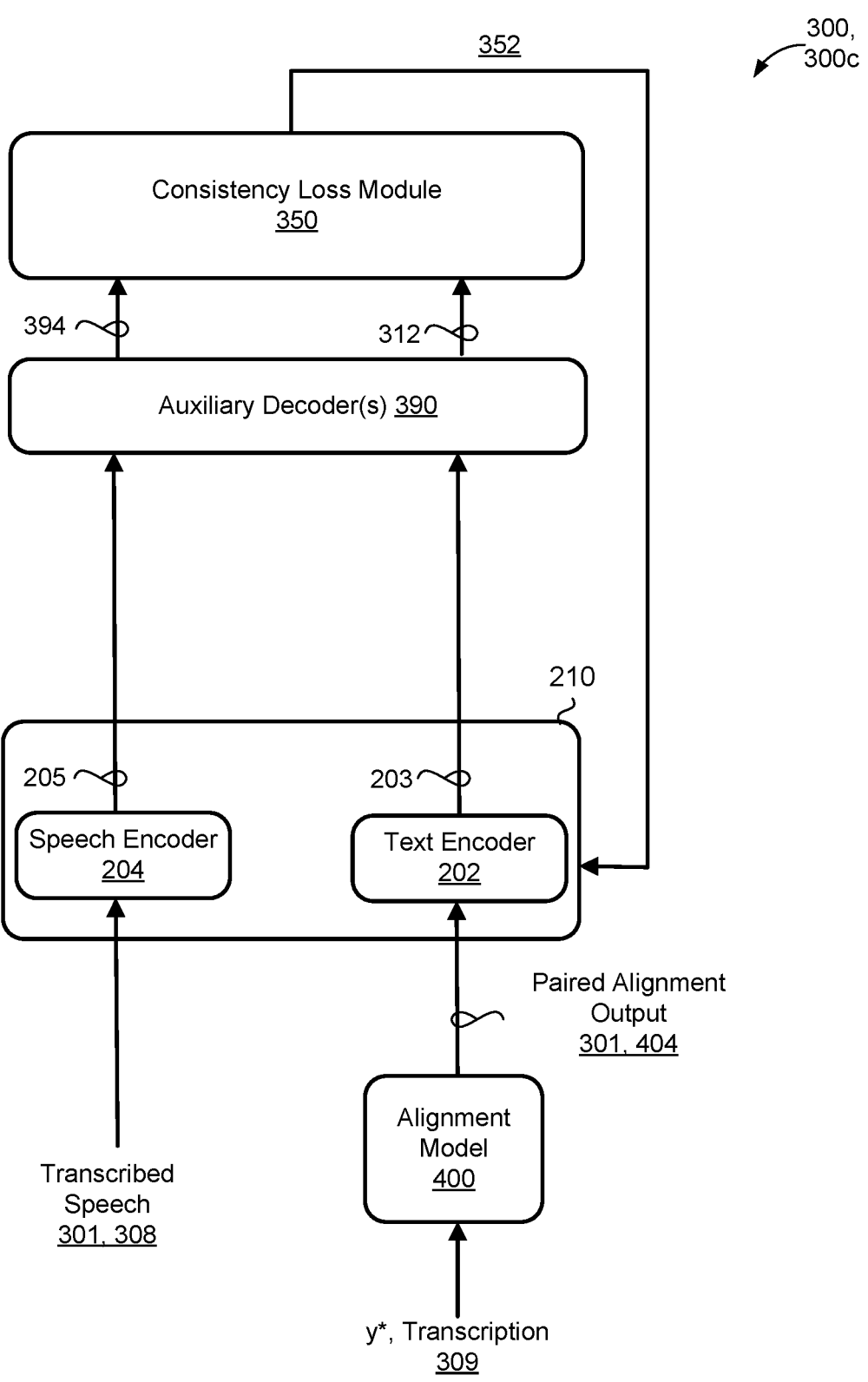

In some examples, the encoder network 210 includes a dual encoder framework that has a speech encoder 204 and a text encoder 202 (FIGS. 3B and 3C).

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces, phonemes, and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in the streaming fashion, the non-streaming fashion, or some combination thereof.

In some examples, the encoder 210 of the RNN-T model includes a plurality of multi-head (e.g., 8 heads) self-attention layers. For example, the plurality of multi-head self-attention layers may include Conformer layers (e.g., Conformer-encoder), transformer layers, performer layers, convolution layers (including lightweight convolution layers), or any other type of multi-head self-attention layers. The plurality of multi-head self-attention layers may include any number of layers, for instance 16 layers. Moreover, the encoder 210 may operate in the streaming fashion (e.g., the encoder 210 outputs initial higher-order feature representations as soon as they are generated), in the non-streaming fashion (e.g., the encoder 210 outputs subsequent higher-order feature representations by processing additional right-context to improve initial higher-order feature representations), or in a combination of both the streaming and non-streaming fashion.

Figure 5:
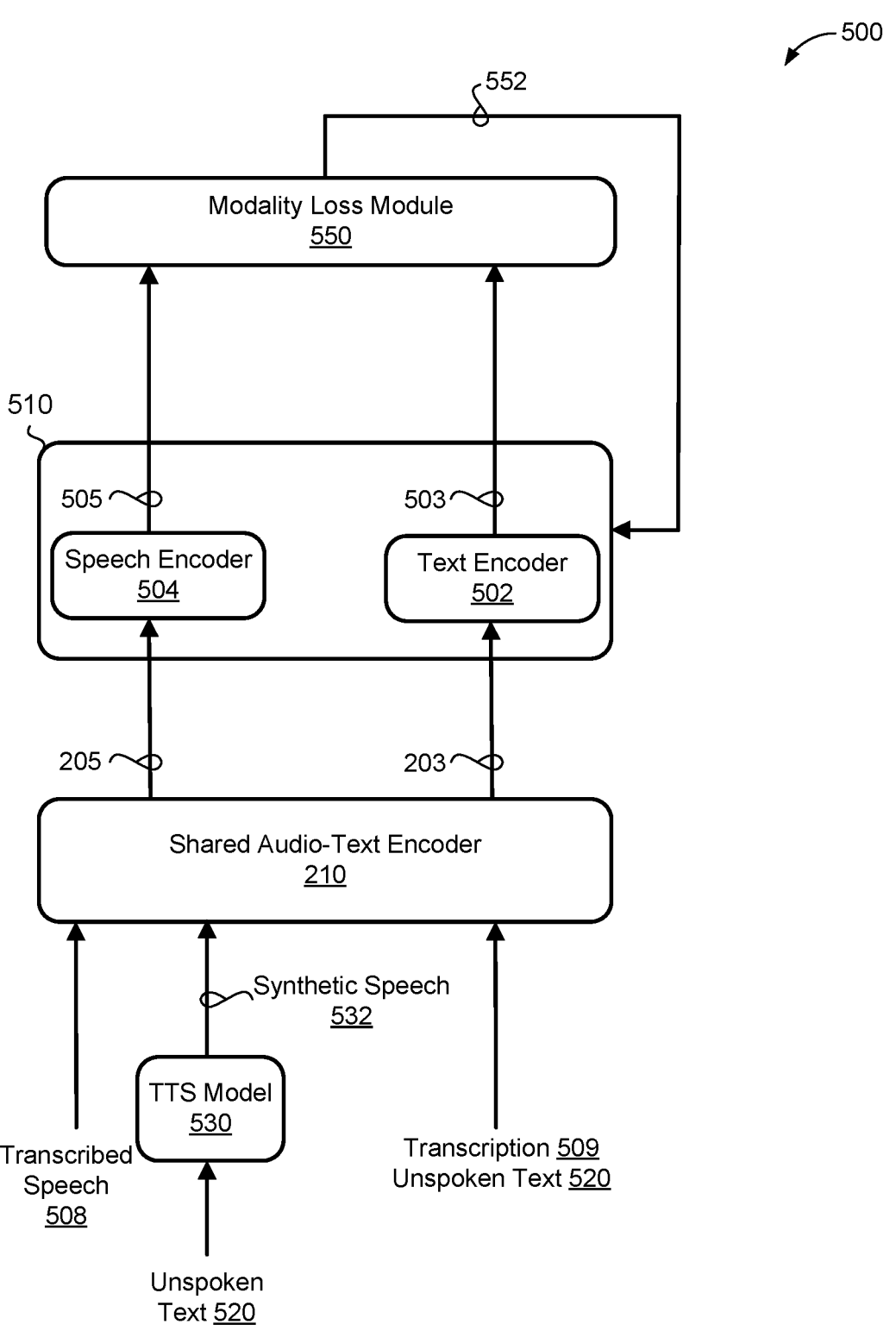
FIG. 5 is a schematic view of an example training process for training an encoder of the speech recognition model.

FIGS. 3A-3C illustrate an example training process 300 for training the encoder 210 of the ASR model 200 (FIG. 2). In some examples, the encoder 210 is a shared audio-text encoder that is compatible with audio and textual inputs, and thus, the encoder 210 may interchangeably be referred to as "the shared audio-text encoder 210" herein. Notably, after training, the shared audio-text encoder 210 is leveraged to train the correction model (e.g., ASR correction model) 510 (FIG. 5). The training process 300 may train the shared audio-text encoder 210 using available training data that includes a set of unspoken textual utterances ($X_{text}$) 320, a set of transcribed non-synthetic speech utterances ($X_{sup}$) 308, and/or un-transcribed non-synthetic speech utterances ($X_{unsup}$) 306. Each unspoken textual utterance 320 includes text-only data (i.e., unpaired data) such that each unspoken textual utterance 320 is not paired with any corresponding spoken audio representation (i.e., speech) of the utterance. The unspoken textual utterance 320 may include any sequence of text chunks including words, word-pieces, phonemes, and/or graphemes. Each un-transcribed non-synthetic speech utterance 306 (also referred to as simply "un-transcribed speech utterance 306") includes audio-only data (i.e., unpaired data) such that the un-transcribed speech utterance 306 is not paired with any corresponding transcription. On the other hand, each transcribed non-synthetic speech utterance 308 (also referred to as simply "transcribed speech utterance 308") includes a corresponding transcription 309 paired with a corresponding non-synthetic speech representation of the corresponding transcribed speech utterance 308.

For simplicity, the training process 300 includes a contrastive self-supervised loss part 300a (FIG. 3A), a supervised loss part 300b (FIG. 3B), and a consistency regularization part 300c (FIG. 3C). The training process 300 trains the shared audio-text encoder 210 on a total loss ($L_{tts4pretrain2}$) based on: contrastive losses ($L_{w2v}$) 225 derived using the contrastive self-supervised loss part 300a from the unspoken training text utterances ($X_{text}$) 320, a corpus of transcribed non-synthetic speech utterances ($X_{sup}$) 308, and un-transcribed non-synthetic speech utterances ($X_{unsup}$) 306; supervised losses ($L_{aux}$) 342, 344 derived using the supervised loss part 300b from the unspoken training text utterances ($X_{text}$) 320 and the transcribed non-synthetic speech utterances ($X_{sup}$) 308; and consistency losses ($\mathcal{J}_{cons}(\theta)$) 352 derived using the consistency regularization part 300c.

The training process 300 may employ an alignment model 400 that is configured to generate, at each of a plurality of output steps, alignment outputs (i.e., textual representations) 402 for each of a plurality of unspoken training text utterances 320 (FIGS. 3A and 3B) or for each of a plurality of transcriptions 309 corresponding to transcribed speech utterances 308 (FIG. 3C). The unspoken textual utterances 320 includes unspoken text that is text-only data, i.e., unpaired data, such that each unspoken textual utterance $(X_{text})$ 320 is not paired with any synthesized or non-synthesized speech. Accordingly, the alignment model 400 generates a corresponding alignment output 402 for each of the unspoken textual utterances 320 or for each of the transcriptions 309.

Figure 4:
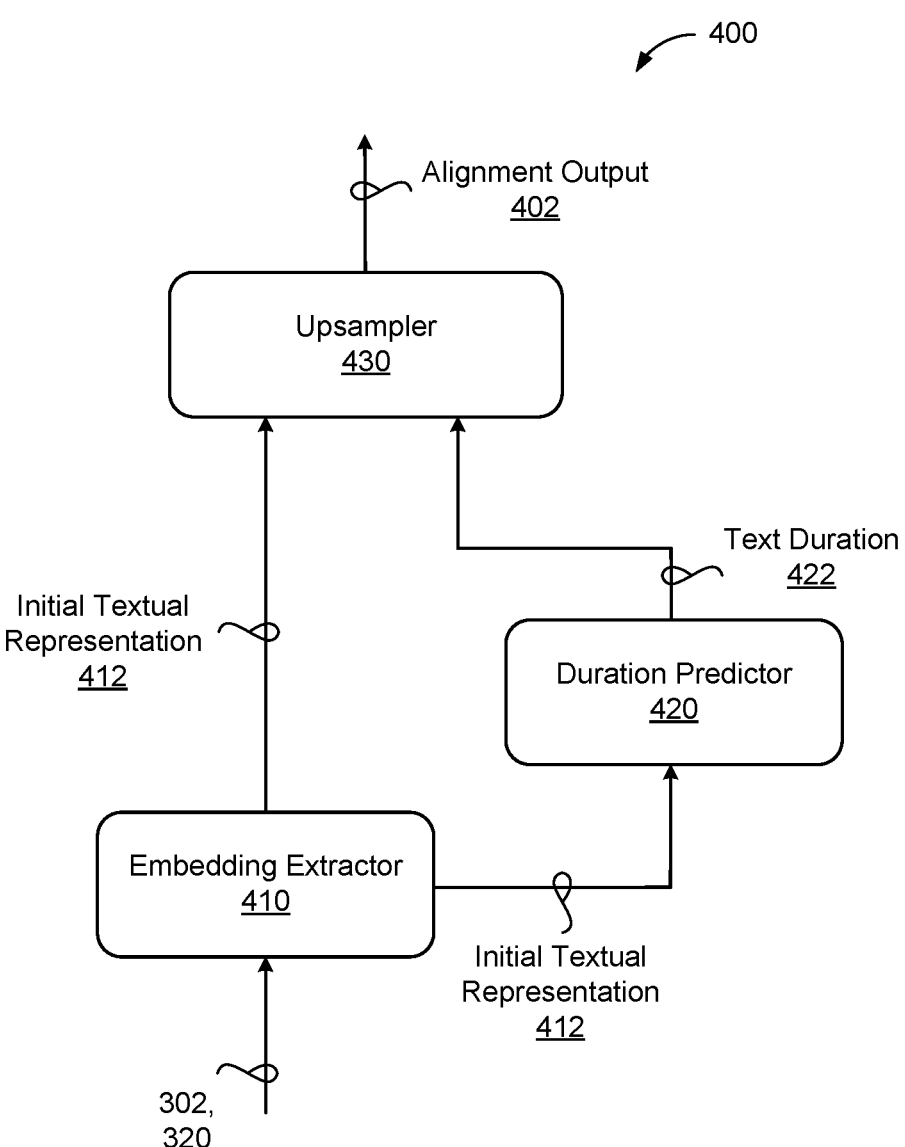
FIG. 4 is a schematic view of an alignment model used during the example training process for training the shared audio-text encoder in FIGS. 3A-3C.

Referring now to FIG. 4, in some examples, the alignment model 400 includes an embedding extractor 410, a duration predictor 420, and an upsampler 430. The embedding extractor 410 receives the unspoken textual utterance 320 (or transcription 309) that includes a sequence of text chunks including words, word-pieces, phonemes, and/or graphemes and extracts a corresponding initial textual representation $(e_t)$ 412. The initial textual representation 412 includes embedding lexical information from the unspoken textual utterance 320 or the transcription 309 corresponding to the transcribed speech utterance 308. The duration predictor 420 receives the initial textual representation 412 from the embedding extractor 410 and predicts a corresponding text chunk duration (i.e., word, word-piece, phoneme, and/or grapheme duration) 422. The text chunk duration 422 indicates a duration the corresponding text chunk would be spoken if a human (or text-to-speech system) spoke the unspoken textual utterance 320. For example, the unspoken textual utterance 320 may include a sequence of phonemes and the duration predictor 420 predicts a phoneme duration 422 for each phoneme in the sequence of phonemes. In this example, the duration predictor 420 predicts the phoneme duration 422 by predicting a probability of non-zero duration for each phoneme and predicting a probability of continuous phoneme duration for each phoneme. As the sequence of phonemes includes regular phonemes, silences between word boundaries, and punctuation marks, only the regular phonemes are associated with non-zero duration while the silences and punctuation marks are generally associated with the continuous phoneme duration. Accordingly, the duration predictor 420 may use a sigmoid activation following a first one of two independent activations to predict the probability of non-zero duration and use a soft plus activation following a second one of the two independent projections to predict the continuous text chunk duration 422 for each text chunk. The duration predictor 420 determines, for each text chunk, whether the probability of non-zero duration is less than a threshold value, and when the probability of non-zero duration is less than the threshold value, a multiplier may zero-out the continuous text chunk duration 422 predicted by the softplus activation for the corresponding text chunk. Otherwise, when the probability of non-zero duration is not less than the threshold value, the predicted text chunk duration 422 may be set equal to the continuous phoneme duration predicted by the softplus activation.

The upsampler 430 receives, for each unspoken textual utterance 320, the corresponding initial textual representation 412 and the predicted text chunk duration 422, and generates an alignment output $(ê_t)$ 402 having a number of frames by upsampling the initial textual representation 412 using the corresponding predicted text chunk duration 422.

In some examples, paired training data is available and the upsampler 430 generates the alignment output 402 as follows:

$$ê_t = \theta_{Refiner}(\text{Resample}(e_t, \text{Align}_{RNN-T}(e_s, t))) \qquad (1)$$

Here, the upsampler 430 includes resampler and refiner layers that align the initial textual embedding 412 to align with a corresponding encoded audio representation 305 (FIGS. 3B and 3C) directly. In other examples, paired training data is not available and the upsampler 430 generates the alignment output 402 as follows.

$$ê_t = \theta_{Refiner}(\text{Resample}(e_t, \theta_{duration}(e_t))) \qquad (2)$$

In particular, the number of frames of the alignment output 402 indicates a predicted speech duration of the unspoken textual utterance 320. Stated differently, the number of frames of the alignment output 402 maps (i.e., aligns) the sequence of text chunks of the unspoken textual utterance 320 to speech frames. Here, the upsampler 430 includes resampler and refiner layers that replicate the initial textual embedding 412 to match the predicted text chunk duration 422 (i.e., speech duration). As such, the alignment output 402 includes a textual representation of the unspoken textual utterance 320 having a timing component that aligns with how a human would speak the unspoken textual utterance 320.

Referring now to FIG. 3A, in some implementations, the shared audio-text encoder 210 includes a conformer encoder including a stack of conformer blocks each of which includes a multi-head self-attention, depth wise convolution, and feed-forward layers. Alternatively, the shared audio-text encoder 210 may include another type of encoder having a stack of self-attention layers/blocks, such as a transformer encoder including a stack of transformer blocks. The shared audio-text encoder 210 can naturally be split into a feature encoder, including a convolution subsampling block 212, and a context network, including a linear layer 214 and a stack of Conformer blocks 216. In some implementations, the convolution subsampling block 212 has two two-dimensional-convolution layers, both with strides (2, 2), resulting in a 4× reduction in the feature sequence length. The convolution subsampling block 212 receives, as input, a sequence of input features/vectors (e.g., mel-frequency spectrograms such as the acoustic frames 110 of FIG. 1) associated with each transcribed non-synthetic speech utterance 308 and each un-transcribed non-synthetic speech utterance 306, and generates, as output, for each of a plurality of output steps, an encoded audio feature 211 that corresponds to a respective one of the transcribed non-synthetic speech utterances 308 or a respective one of the un-transcribed non-synthetic speech utterances 306. The convolution subsampling block 212 may receive, as input, each alignment output 402 and generate, as output, for each of the plurality of output steps, an encoded textual feature 213 that corresponds to a respective one of the alignment outputs 402.

The encoded audio and textual features 211, 213 (i.e., interchangeably referred to as "encoded features 211, 213") output from the convolution subsampling block 212 may be fed to a masking module 218 where some of the encoded features 211, 213 are randomly chosen and replaced with a trained feature vector shared between all masked time steps to provide corresponding masked encoded audio features 211, 211*m* and masked encoded textual features 213, 213*m*. In some examples, the masking module 218 masks the randomly chosen encoded features 211, 213 for masking by randomly sampling without replacement a certain proportion p of all time steps to be start indices and then masks the subsequent M consecutive time steps from every sample index, whereby some spans may overlap. After masking is applied, the linear layer 214 and the Conformer blocks 216 of the context network receives the masked encoded features 211*m* (or encoded features 211, 213 not chosen by the masking module 218) and outputs corresponding contrastive context vectors (i.e., encoded representation) 215 from masked encoded features 211*m*, 213*m*. Moreover, a quantizer 217 receives the encoded features 211, 213 as input, and generates quantized vectors (i.e., target context vectors) 219 as output. Thereafter, a contrastive loss module 221 derives a contrastive loss ($L_{w2v}$) 225 between the contrastive context vectors 215 at the masked positions and the target context vectors 219 as follows.

$$\mathcal{L}_{w2v} = -\log \frac{\exp(\text{sim}(c_t, q_t)/k)}{\sum_{\tilde{q} \sim Q_t} \exp(\text{sim}(c_t, \tilde{q})/k)} \qquad (3)$$

where ct is contrastive context vector 215 centered over a masked time step t and qt represents a target context vector 219 at the time step t in a set of K+1 candidate target context vectors 219 which includes $q_t$ and K distractors. Distractors may be uniformly sampled from other masked time steps of the same utterance.

The contrastive loss 225 is optimized between the contrastive context vectors 215 at the masked positions and the target context vectors 219. After the shared audio-text encoder 210 converges on the un-transcribed non-synthetic speech utterances 306, the training procedure is repeated on both the alignment outputs 402 corresponding to the unspoken textual utterance 320 and the transcribed non-synthetic speech utterances 308. Thus, the contrastive loss ($L_{w2v}$) 225 is optimized for both real/human (non-synthetic) and unspoken textual utterances 320 represented by alignment outputs 402, with additional auxiliary losses on the transcribed non-synthetic speech utterances 308 and the alignment outputs 402 as described in greater detail below with reference to FIG. 3B. Accordingly, the training process 300*a* trains the shared audio-text encoder 210 on the derived contrastive loss 225 applied on the corresponding encoded features 211, 213 associated with each alignment output 402, each transcribed non-synthetic speech utterance 308, and each un-transcribed non-synthetic speech utterance 306 provided as input to the shared audio-text encoder 210. Training the shared audio-text encoder 210 may include updating parameters of the shared audio-text encoder 210 based on the contrastive losses 225.

Referring to FIG. 3B, the supervised loss part 300*b* of the training process 300 is configured to inject lexical information into the shared audio-text encoder 210 during training based on supervised loss terms 342, 344 derived from the transcribed non-synthetic speech utterances 308 and the alignment outputs 402 corresponding to unspoken textual utterances 320 output by the alignment model 400. Notably, the supervised loss part 300*b* leverages one or more auxiliary decoders 390 for generating the supervised loss terms 342, 344. The auxiliary decoders 390 may include Connectionist Temporal Classification (CTC) decoders, Listen Attend Spell (LAS) decoders, or RNN-T decoders. These auxiliary decoders 390 may include at least one of a phoneme decoder configured to decode a sequence of phonemes or a wordpiece decoder configured to decode a sequence of word pieces. The auxiliary decoders 390 could also include a grapheme decoder configured to decode a sequence of graphemes.

In some implementations, the shared audio-text encoder 210 includes a text encoder 202 configured to receive textual inputs and generate corresponding encodings and a speech encoder 204 configured to receive audio inputs and generate corresponding encodings. That is, the text encoder 202 of the shared audio-text encoder 210 is configured to receive alignment outputs 402 (i.e., text embeddings) from the alignment model 400 and the speech encoder 204 is configured to receive transcribed non-synthetic speech utterances 204. Thus, the text encoder 202 generates encoded textual representations 203 for alignment outputs 402 (e.g., corresponding to an unspoken textual utterance 320) and the speech encoder 204 generates encoded audio representations 205 for speech inputs (i.e., transcribed non-synthetic speech utterances 308). Notably, the shared audio-text encoder 210 generates the encoded textual representations 203 and the encoded audio representations 205 such that both representations are compatible with the auxiliary decoder 390 despite the input modality mismatch between text and audio. Accordingly, the shared audio-text encoder 210 generates the encoded textual representations 203 and the encoded audio representations 205 (e.g., multimodal embeddings) into a shared latent representation space compatible with the auxiliary decoder 390.

The auxiliary decoder 390 including the phoneme decoder or the wordpiece decoder receives, as input, each encoded textual representation 203 and generates, as output, a first probability distribution 392 over possible speech recognition hypotheses for the corresponding alignment output 402 at the corresponding time step. In some examples, the first probability distribution 392 over possible speech recognition hypotheses includes one of possible phoneme labels, possible word piece labels, or possible grapheme labels. Thereafter, a supervised loss module 340 may determine an alignment output loss term 342 based on the first probability distribution 392 over possible speech recognition hypotheses for the alignment output 402 corresponding to the unspoken textual utterance 320. Here, the corresponding unspoken textual utterance 320 in which the alignment output 402 is generated from also serves as a ground-truth transcription 309. The supervised loss part 300*b* may train the shared audio-text encoder 210 on the alignment output loss term 342 by updating parameters of the shared audio-text encoder 210 using the alignment output loss term 342.

Similarly, the auxiliary decoder 390 including the phoneme decoder or the wordpiece decoder receives, as input, each encoded audio representation 205 and generates, as output, a second probability distribution 394 over possible non-synthetic speech recognition hypotheses for the corresponding transcribed non-synthetic speech utterance 308 at the corresponding time step. In some examples, the second probability distribution 394 over possible non-synthetic speech recognition hypotheses includes the one of possible phoneme labels, the possible word piece labels, or the possible grapheme labels. Thereafter, the supervised loss module 340 may determine a non-synthetic speech loss term 344 based on the second probability distribution 394 over possible non-synthetic speech recognition hypotheses and the corresponding transcription 309 paired with the transcribed non-synthetic speech utterance 308. Here, the corresponding transcription 309 serves as a ground-truth transcription and may include a sequence of target phonemes, target word pieces, and/or target graphemes. The supervised loss part 300*b* may train the shared audio-text encoder 210 on the non-synthetic speech loss term 344 by updating parameters of the shared audio-text encoder 210 using the non-synthetic speech loss term 344.

The un-transcribed non-synthetic speech utterances 306 and the unspoken textual utterances 320 each correspond to "unpaired" training data whereby the contrastive loss ($L_{w2v}$) 225 derived from the unspoken textual utterances ($X_{text}$) 320 may be combined with the supervised loss $\mathcal{J}_{aux}$ associated with the alignment output loss term 342 to obtain an unspoken textual loss function, $\mathcal{J}_{text}$, as follows.

$$\mathcal{J}_{text} = \mathcal{L}_{w2v}(x \mid \theta_e) + \mathcal{L}_{aux}(y \mid x, \theta_e, \theta_d) \qquad (4)$$

Likewise, the contrastive loss ($L_{w2v}$) 225 derived from the un-transcribed non-synthetic speech utterances ($X_{unsup}$) 306 may be used to express an unsupervised speech loss function, $\mathcal{J}_{unsup\_speech}$, as follows.

$$\mathcal{J}_{unsup\_speech} = \mathcal{J}_{w2v}(x^* \mid \theta_e) \qquad (5)$$

During training of the shared audio-text encoder 210, the alignment outputs 402 and the un-transcribed non-synthetic utterances 306 may be separated or mixed within each batch. In order to force the shared audio-text encoder 210 to learn representations that are effective for both alignment outputs 402 corresponding to unspoken textual utterances 320 and non-synthetic (human/real) speech, the loss mask ∅ is applied when combining the loss functions $\mathcal{J}_{text}$ and of Equations. 5 and 6 to obtain an unpaired data loss function, $\mathcal{J}_{unpaired}$, as follows.

$$\mathcal{J}_{unpaired} = \sigma\mathcal{J}_{text} + (1 - \sigma)\mathcal{J}_{speech} \qquad (6)$$

The transcribed non-synthetic speech utterances 308 correspond to "paired" and "supervised" training data whereby the derived contrastive loss $L_{w2v}$ and the derived supervised loss $\mathcal{J}_{aux}$ associated with the non-synthetic speech loss term 344 may be combined to obtain a paired data loss function, $\mathcal{J}_{paired}$, as follows.

$$\mathcal{J}_{paired} = \mathcal{L}_{w2v}(x \mid \theta_e) + \mathcal{L}_{aux}(y \mid x, \theta_e, \theta_d) \qquad (7)$$

Referring to FIG. 3C, the consistency regularization part (i.e., modality matching part) 300*c* of the training process 300 is configured to promote the shared audio-text encoder 210 to learn consistent predictions between non-synthetic speech (e.g., real/human speech) and alignment outputs 402 corresponding to unspoken textual utterances 320 by generating a consistent loss term ($\mathcal{J}_{cons}(\theta)$) 352 between training utterance pairs 301 that each include a corresponding one of the transcribed non-synthetic speech utterances ($X_{sup}$) 308 and a paired alignment output 404 of the same utterance as the corresponding transcribed non-synthetic speech utterance 308. As such, the non-synthetic speech utterance 308 and the paired alignment output 404 of each training utterance pair 301 is associated with a same ground-truth transcription. In short, the consistent loss term 352 between the transcribed non-synthetic speech utterance 308 and paired alignment output 404 of the same training utterance provides an unsupervised training aspect by encouraging the shared audio-text encoder 210 to behave consistently regardless of whether the training utterance belongs to non-synthetic speech (i.e., speech training data) or the alignment output (i.e., text training data) and independent of supervised loss terms between the ground-truth transcription 309 and each of: non-synthetic speech recognition hypotheses output by the auxiliary decoder 390; and speech recognition hypothesis output by the auxiliary decoder 390.

Similar to the alignment outputs 402 generated from the unspoken textual utterances 320 in FIG. 3B, the alignment model 400 may generate each paired alignment output 404 using the corresponding transcription 309 that is paired with the transcribed non-synthetic speech utterance 308. Here, the non-synthetic speech representation 308 is associated with paired alignment output 404 generated by the alignment model 400 mapping the unspoken textual utterance 320 into speech frames.

During the consistency regularization part 300*c*, the text encoder 202 receives, as input, each paired alignment output 404 and generates, as output, for each of a plurality of time steps, an encoded textual representation 203 that corresponds to the paired alignment output 404 at the corresponding time step. The auxiliary decoder 390 including the phoneme decoder or the wordpiece decoder receives, as input, each encoded textual representation 203 and generates, as output, a first probability distribution 312 over possible speech recognition hypotheses for the corresponding paired alignment output 404 at the corresponding time step. In some examples, the first probability distribution 312 over possible speech recognition hypotheses includes one of possible phoneme labels or possible word piece labels.

Similarly, the speech encoder 204 receives, as input, each transcribed non-synthetic speech utterance 308 as a sequence of features/vectors (e.g., mel-frequency spectrograms such as the acoustic frames 110 of FIG. 1) and generates, as output, for each of a plurality of time steps, an encoded audio representation 205 that corresponds to the transcribed non-synthetic speech utterance 308 at the corresponding time step. The auxiliary decoder 390 including the phoneme decoder or the wordpiece decoder receives, as input, each encoded audio representation 205 and generates, as output, a second probability distribution 394 over possible non-synthetic speech recognition hypotheses for the corresponding transcribed non-synthetic speech utterance 308 at the corresponding time step. In some examples, the second probability distribution 394 over possible non-synthetic speech recognition hypotheses includes one of the possible phoneme labels or the possible word piece labels.

With continued reference to FIG. 3C, the consistency regularization part 300*c* of the training process 300 further determines, at each of the plurality of time steps for each training utterance pair 301, the consistent loss term ($\mathcal{J}_{cons}$($\theta$)) 352 for the corresponding training utterance pair 301 based on the first probability distribution 312 over possible speech recognition hypotheses and the second probability distribution 394 over possible non-synthetic speech recognition hypotheses. For instance, the training process 300 may employ a consistency loss term module 350 configured to receive, at each time step, the corresponding non-synthetic speech and speech recognition results 311, 394 output by the auxiliary decoder 390, and determine the consistency loss term 352 for the corresponding training utterance pair 301 at the time step.

In some examples, the consistency regularization part 300c of the training process 300 determines the consistent loss term 352 based on a Kullback-Leibler divergence ($D_{KL}$) between the first probability distribution 312 over possible speech recognition hypotheses and the second probability distribution 394 over possible non-synthetic speech recognition hypotheses. The consistent loss term 352 based on $D_{KL}$ may be expressed by the following equation.

$$\mathcal{J}_{cons}(\theta) = \mathcal{D}_{KL}\big(p_{\tilde{\theta}}(y \mid x) \| p_{\theta}(y \mid \hat{x})\big) \qquad (8)$$

Here, the consistent loss term 352 determined for the training utterance pair 301 at each time step provides an "unsupervised" loss term that is independent of the accuracy of the auxiliary decoder 390 (e.g., independent of the supervised loss terms 342, 344 of FIG. 3B), and thus, may be employed to update parameters of the shared audio-text encoder 210 for promoting consistency between non-synthetic speech representations and alignment outputs of the same utterances. In batch training, the consistent loss term 352 may correspond to an average loss term obtained for the batch. In other words, the consistent loss term 352 permits the shared audio-text encoder 210 to learn to behave the same, e.g., make consistent encoded representation predictions on both non-synthetic speech (e.g., real/human speech) and alignment outputs of a same training utterance, regardless of whether the training utterance belongs to non-synthetic speech or alignment outputs.

Lastly, the training process 300 may combine the unpaired data loss function ($\mathcal{J}_{unpaired}$), the paired data loss function ($\mathcal{J}_{paired}$), and the consistent loss term ($\mathcal{J}_{cons}$) to obtain an overall loss term, $\mathcal{J}_{tts4pretrain2}$, that may be expressed as follows.

$$\mathcal{J}_{tts4pretrain2} = \mathcal{J}_{unpaired} + \lambda_{1}\mathcal{J}\text{paired} + \lambda_{2}\mathcal{J}_{cons} \qquad (9)$$

where $\lambda_{1}$ may be equal to 1.0 and $\lambda_{2}$ is equal to 0.1. The training process 300 may train the shared audio-text encoder 310 using the overall loss term, $\mathcal{J}_{tts4pretrain2}$, by updating parameters of the shared audio-text encoder 210 to effectively teach the shared audio-text encoder 310 to learn shared representations between speech and text. After training the shared audio-text encoder 210, the audio-text encoder 210 may receive either textual or audio inputs and generate corresponding multimodal embeddings (e.g., encoded textual representations 303 and encoded audio representations 305) in a shared latent space whereby each embedding is compatible with speech recognition models.

FIG. 5 illustrates an example training process 500 for training the correction model 510 of the ASR system 100 (FIG. 1). The training process 500 trains the correction model 510 using training data that includes a set of transcribed speech utterances 508 and/or a set of unspoken textual utterances 520. Each unspoken textual utterance 520 includes text-only data (i.e., unpaired data) such that each unspoken textual utterance 520 is not paired with any corresponding audio representation (i.e., speech) of the utterance. On the other hand, each transcribed speech utterance 508 includes a corresponding transcription 509 paired with a corresponding speech representation of the corresponding transcribed speech utterance 508. The set of transcribed speech utterances 508 and the set of unspoken textual utterances 520 may include the same or different utterances than the set of transcribed speech utterances 308 and the set of unspoken textual utterances 320 (FIGS. 3A-3C).

The training process 500 implements the shared audio-text encoder 210 (e.g., trained by the training process 300 (FIG. 3)), the correction model 510, and a modality loss module 550. As will become apparent, the training process 500 trains the correction model 510 to rescore/correct transcriptions 120 initially generated by the ASR model 200 (FIG. 1). In some implementations, the shared audio-text encoder 210 of the ASR model 200 (FIG. 2) is trained to receive, as input, the transcribed speech utterance 508 and generate, as output, an encoded audio representation 205 for a corresponding transcribed speech utterance 508. In these implementations, the shared audio-text encoder 210 is further configured to receive, as input, a corresponding transcription 509 of the corresponding transcribed speech utterance 508 and generate, as output, an encoded textual representation 203 for the corresponding transcription 509. Optionally, in some examples, the training process 500 implements a text-to-speech (TTS) model 530 that generates a corresponding synthetic speech utterance 532 for each unspoken textual utterance 520 in the set of unspoken textual utterances 520. In these examples, the shared audio-text encoder 210 is configured to receive, as input, the synthetic speech utterances 532 and generate, as output, an encoded audio representation 205 for a corresponding synthetic speech utterance 532. Moreover, in these examples, the shared audio-text encoder 210 is configured to receive, as input, the unspoken textual utterance 520 and generate, as output, an encoded textual representation 203 for a corresponding unspoken textual utterance 520.

As such, the shared audio-text encoder 210 generates the encoded textual representation 203 and the encoded audio representation 205 for each respective transcribed speech utterance 508 and/or each respective synthetic speech utterance 532. The shared audio-text encoder 210 outputs the encoded textual representation 203 and the encoded audio representation 205 to the correction model 510. In some examples, the correction model 510 includes a dual encoder framework architecture. Namely, the correction model 510 may include a text encoder 502 and a speech encoder 504. The speech encoder 504 may include a first stack of multi-head self-attention layers and the text encoder 502 may include a second stack of multi-head self-attention layers where the speech encoder 504 and the text encoder 502 include the same type of multi-head self-attention layers. For example, the first and second stack of multi-head attention layers may include a stack of transformer layers (e.g., speech transformer encoder and text transformer encoder) or a stack of conformer layers. In other examples, the correction model 510 includes a single encoder having a stack of multi-head self-attention layers configured to interchangeably process the encoded textual representations 203 and the encoded audio representations 205.

The speech encoder 504 of the correction model 510 is configured to receive, as input, the encoded audio representations 205 generated by the shared audio-text encoder 210 and generate, as output, a higher order audio feature representation 505 for a corresponding encoded audio representation 205. The text encoder 502 is configured to receive, as input, the encoded textual representations 203 generated by the shared audio-text encoder 210 and generate, as output, a higher order textual feature representation 503 for a corresponding encoded textual representation 203. Notably, the higher order audio feature representation 505 and the higher order textual feature representation 503 are multimodal embeddings such that either embedding may be used to correct transcriptions 120 generated by the ASR model 200, described in greater detail with reference to FIG. 6. As such, the training process 500 aims to train the text encoder 502 and the speech encoder 504 of the correction model 510 by minimizing a distance between higher order textual feature representations 503 and higher order audio feature representation 505 generated for the same transcribed speech utterance 504. Stated differently, the training process 500 trains the correction model 510 to generate similar higher order textual feature representations 503 and higher order audio feature representation 505 for the phonetically similar transcribed speech utterances 504 (e.g., the same audio/text utterance) and generate dissimilar higher order textual feature representations 503 and higher order audio feature representation 505 for phonetically different transcribed speech utterance 504 (e.g., different audio/text utterances).

To that end, the modality loss module 550 is configured to determine a loss (e.g., cosine distance) 552 between the higher order audio feature representation 505 and the higher order textual representation 503 each corresponding to a same respective transcribed speech utterance 508. In particular, the modality loss module 550 may determine the loss 552 by determining a cosine distance between the first higher order audio feature representation 505 and the higher order textual representation 503. Using the loss 552 determined for each transcribed speech utterance 508, the training process trains the correction model 510 based on the loss 552. Training the correction model 510 may include updating parameters of the text encoder 502 and parameters of the speech encoder 504 based on the loss 552 determined for each respective transcribed speech utterance 504. Notably, the training process 500 trains the correction model 510 using the higher order textual feature representations 503 and the higher order audio feature representations 505 directly without ever decoding either of the representations into text.

In addition to, or in lieu of, training the correction model 510 based on the loss 552 determined for each respective transcribed speech utterances 508, the training process 500 may train the correction model 510 based on losses 552 determined for the set of unspoken textual utterances 520. That is, the training process 500 may use the synthetic speech utterances 532 generated by the TTS model 530 using the set of unspoken textual utterances 520 as the audio training data and the set of unspoken textual utterances as the textual training data. Thus, the training process 500 may use training data that includes the set of transcribed speech utterances 508, the set of unspoken textual utterances 520, or some combination thereof to train the correction model 510.

Figure 6:
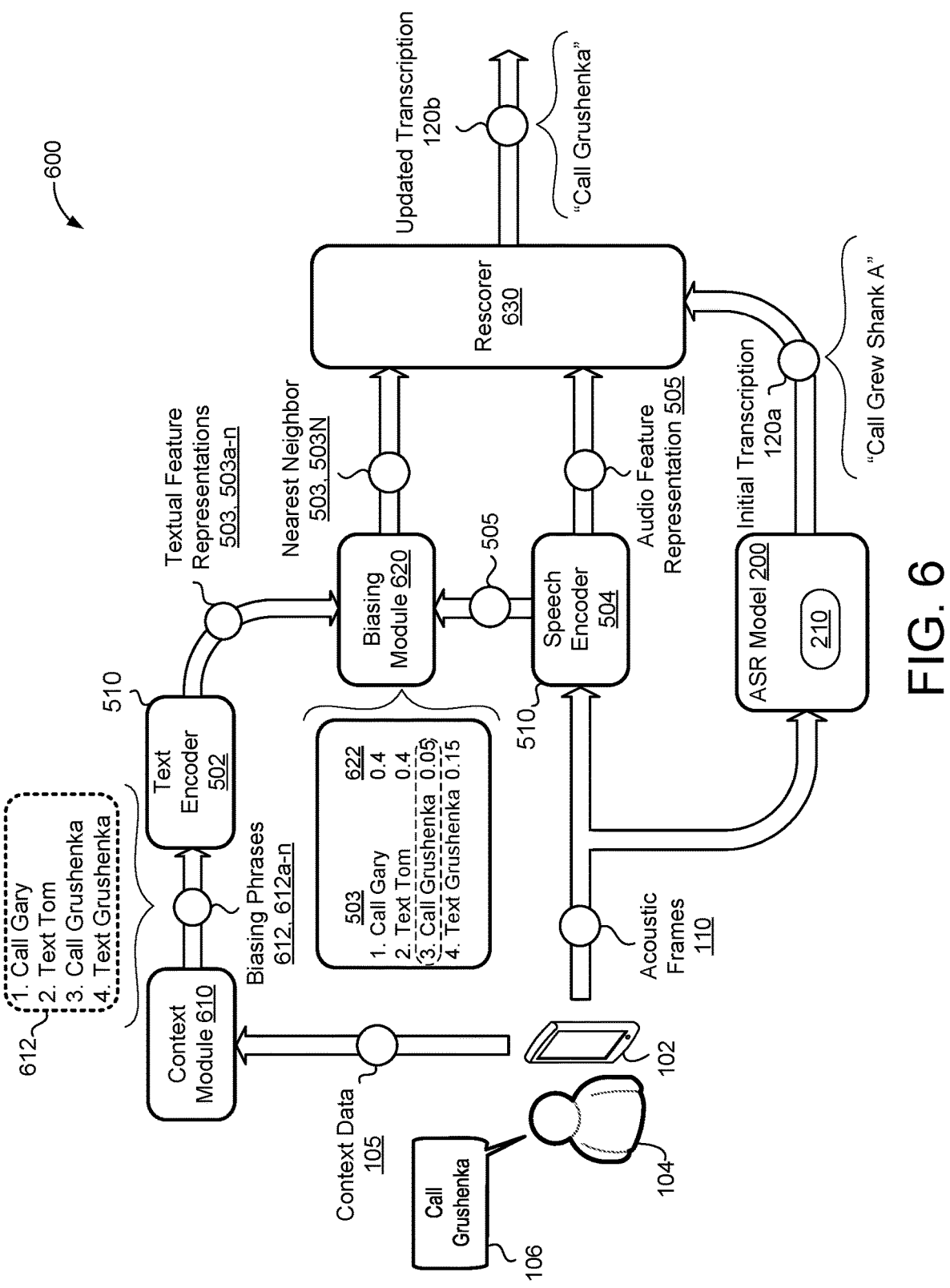
FIG. 6 is a schematic view of an example speech recognition environment using the trained encoder of the speech recognition model.

FIG. 6 illustrates an example speech environment 600 using the correction model 510 to correct a misrecognized transcription generated by the ASR model 200. The speech environment 600 includes the ASR model 200 including the trained shared speech-text encoder 210 (e.g., after being trained by the training process 300 FIGS. 3A-3C), the correction model 510 including the trained text encoder 502 and speech encoder 504 (e.g., after being trained by the training process 500 (FIG. 5)), a context module 610, a biasing module 620, and a rescorer 630. In the example shown, the user 104 speaks the utterance 106 of "Call Grushenka" and the ASR model 200 receives acoustic frames 110 corresponding to the utterance 106. The ASR model 200 includes the trained speech-text encoder 210 and processes the audio input to generate an initial transcription 120, 120a of "Call Grew Shank A." Notably, the rare word "Grushenka" may be a contact of the user 104 that was not included in the training data for the ASR model 200. Consequently, the initial transcription 120a generated by the ASR model 200 is an incorrect transcription and the ASR model 200 is unlikely to correct the transcription even with further audio-only processing of future acoustic frames.

The context module 610 is configured to generate a list of biasing phrases 612, 612a-n based on a current context of the user device 102. As will become apparent, the list of biasing phrases 612 may be leveraged to correct any potential misrecognized transcriptions by the encoder 210. More specifically, the context module 610 is configured to obtain context data (e.g., a current context) 105 from the user device 102 that receives a speech utterance 106 spoken by the user 104 associated with the user device 102 and generate, as output, the list of biasing phrases 612 using the context data 105. The context data 105 may include any relevant contextual information associated with the user device 102 that may indicate a phrase the user 104 may speak. For example, the context data 105 may include, but is not limited to, a dialog state, a device state, a language of the received utterance 106, a geographical location of the user device 102, and/or an application running on the user device 102. The dialog state refers to a state of a conversation between the user and the user device 102. For instance, the user 104 may ask "do I have any meetings tomorrow?" whereby the user device 102 responds "you have one meeting tomorrow." In this instance, the dialog state includes the question asked by the user 104 and the response generated by the user device 102 such that the dialog state indicates the user 104 is likely referring to "the one meeting tomorrow" when the user 104 asks a follow-up question of "what time is it?" The device state indicates whether the user device is in a sleep or wake state, currently processing speech or not, detected a hotword spoken by the user 104, and/or any other device state.

Accordingly, using the context data 105 received from the user device 102, the context module 610 generates the list of biasing phrases 612, where each biasing phrase is associated with the current context of the user device 102. Stated differently, each biasing phrase 612 is a contextually relevant transcription the user 104 is likely to speak based on the current context of the user device 102. For instance, the context data 105 may indicate the user device 102 is located in a particular city such that the context module 610 generates the list of biasing phrases 612 including points of interest for the particular city.

In the example shown, the context module 610 receives context data 105 indicating the user device 102 is currently displaying a contact application that stores a list of contact names associated with the user 104. Here, the contact application may include contact names of "Gary," "Tom," and "Grushenka" associated with the user 104 such that the context module 610 generates the list of biasing phrases 612 including "call Gary," "text Tom," "call Grushenka," and "text Grushenka." Based on the user device 102 currently executing/displaying the contact application, the context module anticipates the user 104 may speak one of the generated biasing phrases 612. The text encoder 502 of the correction model 510 receives the list of biasing phrases 612 (e.g., textual input) and generates a corresponding higher order textual feature representation 503, 503a-n for each biasing phrase 612 in the list of biasing phrases 612. Advantageously, the text encoder 502 is trained to generate the higher order textual feature representations 503 with a minimal cosine distance from a corresponding higher order audio feature representations 505 for the same spoken utterance 106.

The speech encoder 504 of the correction module 510 receives the sequence of acoustic frames 110 corresponding to the utterance 106 spoken by the user 104 and generates a higher order audio feature representation 505 for the utterance 106. The speech encoder 504 outputs the higher order audio feature representation 505 to the biasing module 620 and the rescorer 630. Continuing with the example above, the speech encoder 504 generates the higher order audio feature representation 505 based on the sequence of acoustic frames 110 for the utterance "Call Grushenka." The rare word "Grushenka" may have similarly been unseen by the correction model 510 during training.

Accordingly, the biasing module 620 is configured to identify a nearest neighbor higher order textual feature representation 503, 503N to the higher order audio feature representation 505. Here, the nearest neighbor higher order textual feature representation 503N is the higher order textual feature representation 503 generated from the list of biasing phrases 612 with a smallest cosine distance 622 to the higher order audio feature representation 505 corresponding to the utterance 106. That is, the biasing module 620 determines, for each respective higher order textual feature representation 503 generated from the list of biasing phrases 612, a corresponding cosine distance 622 to the higher order audio feature representation 505. Thereafter, the biasing module 620 identifies a respective one of the higher order textual feature representations 503 having a lowest corresponding cosine distance 622 as the nearest neighbor higher order textual feature representation 503N. The lowest corresponding cosine distance 622 of the nearest neighbor higher order textual feature representation 503N indicates that the nearest neighbor higher order textual feature representation 503N is the most likely biasing phrase 612 from the list of biasing phrases 612 spoken by the user 104.

Continuing with the example shown, the biasing module 620 determines a cosine distance 622 of '0.4' for each of the higher order textual feature representations 503 generated for "Call Gary" and "Text Tom," a cosine distance 622 of '0.05' for the higher order textual feature representation 503 generated for "Call Grushenka," and a cosine distance 622 of '0.15' of for the higher order textual feature representation 503 generated for "Text Grushenka." Here, the biasing module 620 identifies the higher order textual feature representation 503 generated for "Call Grushenka" as the nearest neighbor higher order textual feature representation 503N because '0.05' is the lowest corresponding cosine distance 622 and outputs the nearest neighbor higher order textual feature representation 503N to the rescorer 630. Since the correction model 510 is trained to generate similar higher order audio feature representations 505 and higher order textual representations 503 for the same utterance, the biasing module 620 is likely to select an accurate transcription from the higher order textual feature representation 503 when present in the list of biasing phrases 612. Notably, in the example shown, the nearest neighbor higher order textual feature representation 503N corresponds to an encoding for the correct transcription of the utterance 106 spoken by the user 104.

In some implementations, the biasing module 620 does not need to exhaustively compare cosine distances 622 between the higher order textual representation 503 of each biasing phrase 612 in the list of biasing phrases 612 against the higher order audio representation 505 to identify the nearest neighbor higher order textual feature representation 503N. In particular, the biasing module 620 may use an embedded searching algorithm to identify the nearest neighbor higher order textual feature representation 503N without having to compare the cosine distance 622 for each higher order textual representation 503. Advantageously, using the embedded searching algorithm saves computing resources and/or latency in identifying the nearest neighbor higher order textual feature representation 503N.

The rescorer 630 is configured to receive, as input, the higher order audio feature representation 505 generated by the speech encoder 504 for the utterance 106, the nearest neighbor higher order textual feature representation 503N identified by the biasing module 620 using the higher order audio feature representation 505, and the initial transcription 120a generated by the ASR model 200. Here, the rescorer 630 is configured to determine whether to replace initial transcription 120a with an updated transcription 120, 120b based on the nearest neighbor higher order textual feature representation 503N. That is, the rescorer 630 determines whether the initial transcription 120a is an accurate (or inaccurate) representation of the utterance 106 spoken by the user 104 or the neighbor higher order textual feature representation 503N is an accurate representation of the utterance spoken by the user 104. For instance, the rescorer 630 may determine whether a confidence value of the transcription 120 and/or the neighbor higher order textual feature representation 503N satisfies a threshold.

In some examples, the rescorer 630 determines whether the lowest corresponding cosine distance 622 of nearest neighbor higher order textual feature representation 503N satisfies a threshold distance, and in response to determining that the lowest corresponding cosine distance 622 of nearest neighbor higher order textual feature representation 503N satisfies the threshold distance, replaces the initial transcription 120a generated by the ASR model 200 with the updated transcription 120b corresponding to the neighbor higher order textual feature representation 503N. In these examples, the rescorer 630 may replace the initial transcription 120a with the updated transcription 120b before or after the ASR model 200 sends the initial transcription 120a to the user device 102. Otherwise, when the lowest corresponding cosine distance 622 of nearest neighbor higher order textual feature representation 503N fails to satisfy the threshold distance (e.g., the initial transcription 120a is a correct transcription), the rescorer 630 does not replace the initial transcription 120a.

Advantageously, the higher order textual feature representations 503 and the higher order audio feature representations 505 are both multimodal embeddings such that the biasing module 620 may compare the multimodal embeddings to determine whether any of the contextual relevant phrases (e.g., list of biasing phrases 612) are accurate transcriptions of a spoken utterance. Thus, because the correction model 510 is trained to generate similar text and audio embeddings for a same speech/text utterance, the ASR system is able to compare whether any of the biasing phrases 612 are similar to the spoken utterance. Especially in scenarios where the spoken utterance includes rare words not included in training data (but are included in text-only form in connection with the user device 102), correction model 510 may be leveraged to increase transcription accuracy. Simply put, the use of multimodal embeddings to query contextually relevant transcriptions enables ASR systems to leverage the advantages of both text and audio to improve speech recognition accuracy by correcting misrecognized transcriptions.

FIG. 7 is a flowchart of an exemplary arrangement of operations for a computer-implemented method 700 for improving automatic speech recognition accuracy with multimodal embeddings search. Data processing hardware 810 (FIG. 8) may execute instructions stored on memory hardware 820 (FIG. 8) that causes the data processing hardware 810 to perform operations for the method 700. The data processing hardware 810 may include data processing hardware 111 of the user device 102 or data processing hardware residing on the remote computing device 201. The memory hardware 820 may include memory hardware 113 of the user device 102 or memory hardware residing on the remote computing device 201. At operation 702, the method 700 includes receiving training data that includes a set of transcribed speech utterances 508. Each respective transcribed speech utterance 508 is paired with a corresponding transcription 509.

For each respective transcribed speech utterance 508 of the set of transcribed speech utterances 508, the method 700 performs operations 704-710. At operation 704, the method 700 includes generating, by a shared audio-text encoder 210 of a speech recognition model 200, an encoded audio representation 205 for the respective transcribed speech utterance 508 and an encoded textual representation 203 for a corresponding transcription 509 of the respective transcribed speech utterance 508. At operation 706, the method 700 includes generating, by a speech encoder 204 of a correction model 510, a higher order audio feature representation 505 for a corresponding encoded audio representation 205. At operation 708, the method 700 includes generating, by a text encoder 502 of the correction model 510, a higher order textual feature representation 503 for a corresponding encoded textual representation 203. At operation 710, the method 700 includes determining a loss 552 for the respective transcribed speech utterance 508 based on the higher order audio feature representation 505 and the higher order textual feature representation 503 each corresponding to the respective transcribed speech utterance 508. At operation 712, the method 700 includes training the speech encoder 504 and the text encoder 502 of the correction model 510 based on the loss 552 determined for each respective transcribed speech utterance 508 of the set of transcribed speech utterances 508.

Figure 8:
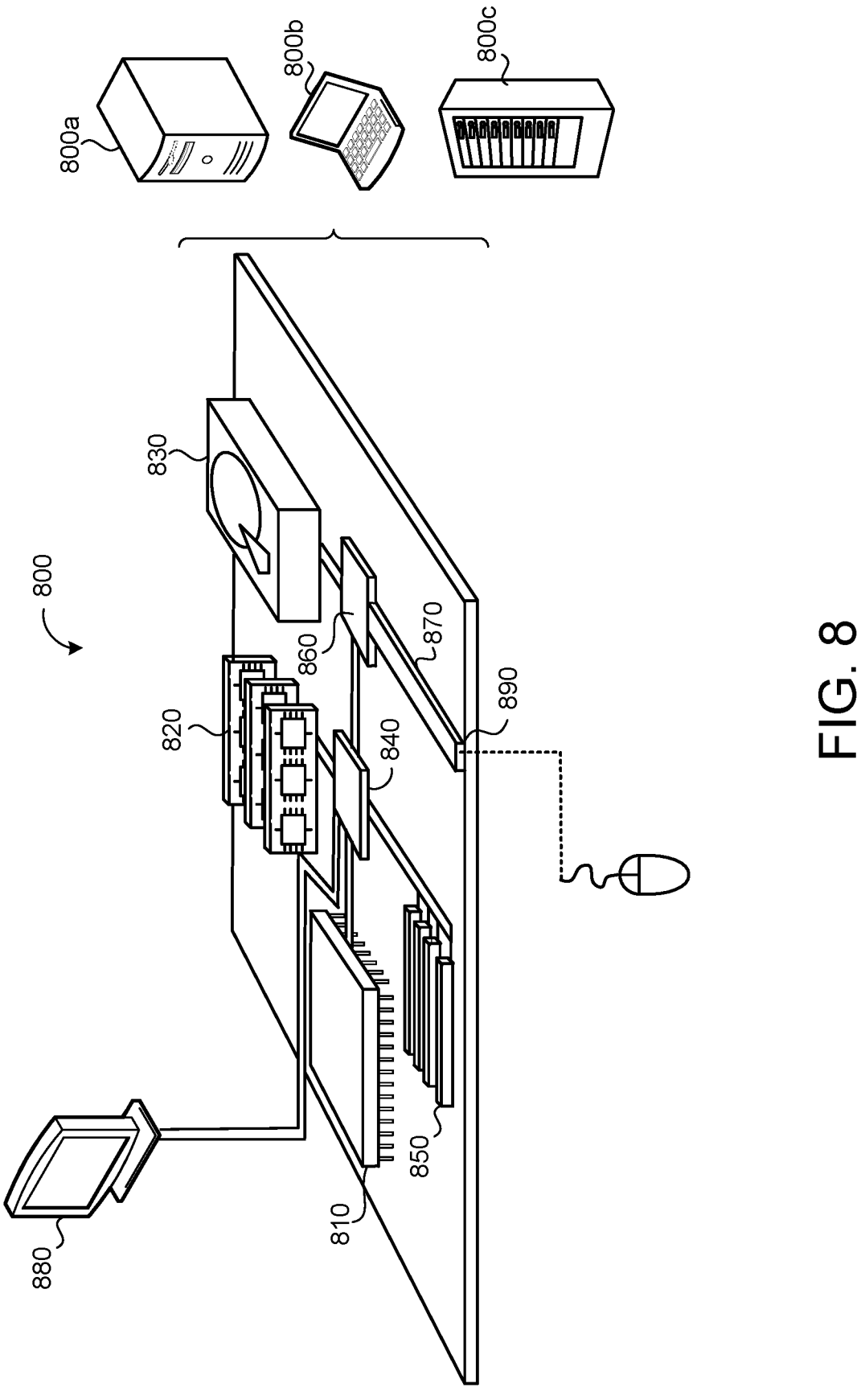
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:

receiving training data comprising a set of transcribed speech utterances, each respective transcribed speech utterance paired with a corresponding transcription;

for each respective transcribed speech utterance of the set of transcribed speech utterances:

generating, by a shared audio-text encoder of a speech recognition model configured to receive both the respective transcribed speech utterance and the corresponding transcription of the respective transcribed speech utterance as input, both a corresponding encoded audio representation for the respective transcribed speech utterance and a corresponding encoded textual representation for the corresponding transcription of the respective transcribed speech utterance;

generating, by a speech encoder of a correction model configured to receive the corresponding encoded audio representation generated by the shared audio-text encoder as input, a higher order audio feature representation for the corresponding encoded audio representation;

generating, by a text encoder of the correction model configured to receive the corresponding encoded textual representation generated by the shared audio-text encoder as input, a higher order textual feature representation for the corresponding encoded textual representation; and determining a loss for the respective transcribed speech utterance based on the higher order audio feature representation and the higher order textual feature representation each corresponding to the respective transcribed speech utterance; and training the speech encoder and the text encoder of the correction model based on the loss determined for each respective transcribed speech utterance of the set of transcribed speech utterances.

2. The computer-implemented method of claim 1, wherein:

the speech encoder comprises a first stack of multi-head self-attention layers; and the text encoder comprises a second stack of multi-head self-attention layers.

3. The computer-implemented method of claim 2, wherein the first and second stack of multi-head self-attention layers comprise a stack of transformer layers or a stack of conformer layers.

4. The computer-implemented method of claim 1, wherein the operations further comprise:

obtaining context data from a user device that receives a speech utterance, the context data indicating a current context of the user device; and generating a list of biasing phrases based on the context data, each biasing phrase in the list of biasing phrases associated with the current context of the user device.

5. The computer-implemented method of claim 4, wherein the context data obtained from the user device comprises at least one of:

a dialog state of the user device;

a device state of the user device;

a geographic location of the user device;

an application executing on the user device; or a language of a speech utterance received by the user device.

6. The computer-implemented method of claim 1, wherein the training data further comprises a set of unspoken textual utterances, each unspoken textual utterance not paired with any corresponding spoken utterance.

7. The computer-implemented method of claim 6, wherein the operations further comprise generating, using a text-to-speech model, a corresponding synthetic speech utterance for each unspoken textual utterance of the set of unspoken textual utterances.

8. The computer-implemented method of claim 1, wherein the operations further comprise:

receiving a speech utterance spoken by a user associated with a user device;

generating, using the speech recognition model, an initial transcription for the speech utterance; and generating, using the trained speech encoder of the correction model, a second higher order audio feature representation for the speech utterance.

9. The computer-implemented method of claim 8, wherein the operations further comprise:

generating a list of biasing phrases based on context data of the user device;

for each respective biasing phrase in the list of biasing phrases:

generating, using the trained text encoder of the correction model, a second higher order textual feature representation for the respective biasing phrase; and determining a corresponding cosine distance between the second higher order audio feature representation and the second higher order textual feature representation; and determining a nearest neighbor second higher order textual feature representation from the second higher order textual feature representations generated by the trained text encoder for each respective biasing phrase by selecting a respective one of the second higher order textual feature representations comprising a lowest corresponding cosine distance.

10. The computer-implemented method of claim 9, wherein the operations further comprise:

determining that the initial transcription is an inaccurate transcription for the speech utterance; and in response to determining that the initial transcription is an inaccurate transcription, replacing the initial transcription generated by the speech recognition model with an updated transcription corresponding to the nearest neighbor higher order textual feature representation.

11. A system comprising:

data processing hardware; and memory hardware in communication with the data processing hardware, the memory hardware storing instructions that when executed on the data processing hardware cause the data processing hardware to perform operations comprising:

receiving training data comprising a set of transcribed speech utterances, each respective transcribed speech utterance paired with a corresponding transcription;

for each respective transcribed speech utterance of the set of transcribed speech utterances:

generating, by a shared audio-text encoder of a speech recognition model configured to receive both the respective transcribed speech utterance and the corresponding transcription of the respective transcribed speech utterance as input, both a corresponding encoded audio representation for the respective transcribed speech utterance and a corresponding encoded textual representation for the corresponding transcription of the respective transcribed speech utterance;

generating, by a speech encoder of a correction model configured to receive the corresponding encoded audio representation generated by the shared audio-text encoder as input, a higher order audio feature representation for the corresponding encoded audio representation;

generating, by a text encoder of the correction model configured to receive the corresponding encoded textual representation generated by the shared audio-text encoder as input, a higher order textual feature representation for the corresponding encoded textual representation; and determining a loss for the respective transcribed speech utterance based on the higher order audio feature representation and the higher order textual feature representation each corresponding to the respective transcribed speech utterance; and training the speech encoder and the text encoder of the correction model based on the loss determined for each respective transcribed speech utterance of the set of transcribed speech utterances.

12. The system of claim 11, wherein:

the speech encoder comprises a first stack of multi-head self-attention layers; and the text encoder comprises a second stack of multi-head self-attention layers.

13. The system of claim 12, wherein the first and second stack of multi-head self-attention layers comprise a stack of transformer layers or a stack of conformer layers.

14. The system of claim 11, wherein the operations further comprise:

obtaining context data from a user device that receives a speech utterance, the context data indicating a current context of the user device; and generating a list of biasing phrases based on the context data, each biasing phrase in the list of biasing phrases associated with the current context of the user device.

15. The system of claim 14, wherein the context data obtained from the user device comprises at least one of:

a dialog state of the user device;

a device state of the user device;

a geographic location of the user device;

an application executing on the user device; or a language of a speech utterance received by the user device.

16. The system of claim 11, wherein the training data further comprises a set of unspoken textual utterances, each unspoken textual utterance not paired with any corresponding spoken utterance.

17. The system of claim 16, wherein the operations further comprise generating, using a text-to-speech model, a corresponding synthetic speech utterance for each unspoken textual utterance of the set of unspoken textual utterances.

18. The system of claim 11, wherein the operations further comprise:

receiving a speech utterance spoken by a user associated with a user device;

generating, using the speech recognition model, an initial transcription for the speech utterance; and generating, using the trained speech encoder of the correction model, a second higher order audio feature representation for the speech utterance.

19. The system of claim 18, wherein the operations further comprise:

generating a list of biasing phrases based on context data of the user device;

for each respective biasing phrase in the list of biasing phrases:

generating, using the trained text encoder of the correction model, a second higher order textual feature representation for the respective biasing phrase; and determining a corresponding cosine distance between the second higher order audio feature representation and the second higher order textual feature representation; and determining a nearest neighbor second higher order textual feature representation from the second higher order textual feature representations generated by the trained text encoder for each respective biasing phrase by selecting a respective one of the second higher order textual feature representations comprising a lowest corresponding cosine distance.

20. The system of claim 19, wherein the operations further comprise:

determining that the initial transcription is an inaccurate transcription for the speech utterance; and in response to determining that the initial transcription is an inaccurate transcription, replacing the initial transcription generated by the speech recognition model with an updated transcription corresponding to the nearest neighbor higher order textual feature representation.

* * * * *